United States Patent
Miwa (10) Patent No.: US 12,431,706 B2
(45) Date of Patent: Sep. 30, 2025

(54) DESCON OPERATION SAFETY SYSTEM

(71) Applicant: TECHNOMIRAI CO., LTD., Tokyo (JP)

(72) Inventor: Kazuo Miwa, Tokyo (JP)

(73) Assignee: TECHNOMIRAI CO., LTD., Tokyo (JP)

( * ) Notice: Subject to any disclaimer, the term of this patent is extended or adjusted under 35 U.S.C. 154(b) by 307 days.

(21) Appl. No.: 18/253,051

(22) PCT Filed: Jan. 19, 2021

(86) PCT No.: PCT/JP2021/001702
§ 371 (c)(1),
(2) Date: May 16, 2023

(87) PCT Pub. No.: WO2022/153554
PCT Pub. Date: Jul. 21, 2022

(65) Prior Publication Data
US 2024/0022069 A1 Jan. 18, 2024

(30) Foreign Application Priority Data
Jan. 18, 2021 (WO) .................. PCT/JP2021/001511

(51) Int. Cl.
*H02J 3/00* (2006.01)
(52) U.S. Cl.
CPC .................................. *H02J 3/001* (2020.01)
(58) Field of Classification Search
CPC .... H02J 3/001; H02J 3/0012; H02J 13/00002; G06Q 10/063; G06Q 50/06; Y02E 40/70; Y04S 10/50
See application file for complete search history.

(56) References Cited

U.S. PATENT DOCUMENTS

| | | | |
|---|---|---|---|
| 2011/0095608 A1* | 4/2011 | Jonsson | H01R 13/703 307/39 |
| 2011/0125336 A1* | 5/2011 | Groves | H02S 10/12 307/65 |

(Continued)

FOREIGN PATENT DOCUMENTS

| | | |
|---|---|---|
| CN | 202886094 U | 4/2013 |
| JP | 2006158146 A | 6/2006 |

(Continued)

OTHER PUBLICATIONS

International Search Report (PCT/ISA/210) with translation and Written Opinion (PCT/ISA/237) mailed on Apr. 6, 2021 by the Japanese Patent Office as the International Searching Authority for International Application No. PCT/JP2021/001511. (8 pages).

*Primary Examiner* — Ziaul Karim
(74) *Attorney, Agent, or Firm* — Buchanan Ingersoll & Rooney PC (57) ABSTRACT

When a power source-side electric path from a power source side and a load-side electric path directed toward a load that operates with power supply, a receptacle serving as an electric connection portion for supplying power to the load are electrically connected to each other via a power device, the system automatically performs ON/OFF switching of each of the loads, automatically checks a meter for a power usage amount in the load and automatically calculates the power usage amount to save labor, and further prevents occurrence of an electrical accident leading to a fire by, for example, detecting bolt looseness in a bolt screw tightening connection portion in the power device, insufficient insertion into a receptacle, and leakage due to dust adhesion in the bolt screw tightening connection portion.

6 Claims, 4 Drawing Sheets

(56) References Cited

U.S. PATENT DOCUMENTS

| | | | | |
|---|---|---|---|---|
| 2017/0229274 A1* | 8/2017 | Shea | .................. | H01H 89/04 |
| 2019/0229535 A1* | 7/2019 | Pmsvvsv | ........... | H01M 8/04992 |
| 2020/0212666 A1* | 7/2020 | Manahan | ............. | H01H 1/5866 |
| 2021/0006073 A1* | 1/2021 | Donahue | .......... | G01R 19/16547 |

FOREIGN PATENT DOCUMENTS

| | | | |
|---|---|---|---|
| JP | 2008017688 | A | 1/2008 |
| JP | 2008290245 | A | 12/2008 |
| JP | 2013129044 | A | 7/2013 |
| JP | 2014186689 | A | 10/2014 |
| JP | 6732278 | B1 | 7/2020 |

\* cited by examiner

DESCON OPERATION SAFETY SYSTEM

TECHNICAL FIELD

The present invention relates to a system in which, when a power source-side electric path from a power source side and a load-side electric path directed toward a load that operates with power supply, such as a lighting facility/device, an air conditioning facility/device, a freezing/refrigerating facility/device, or a production facility/device, a receptacle serving as an electric connection portion for supplying power to the load and the like, and the like are electrically connected to each other via a power device such as a power receiving and transforming facility, a switch board, a distribution board, an electric lamp board, a power board, a control board, or a junction box, including an electric device such as a main breaker or a leakage breaker, the system automatically performs ON/OFF switching of each of the loads, automatically checks a meter for a power usage amount in the load and automatically calculates the power usage amount to save labor, and further prevents occurrence of an electrical accident leading to a fire by, for example, detecting bolt looseness in a bolt screw tightening connection portion in the power device, insufficient insertion into a receptacle, and leakage due to dust adhesion in the bolt screw tightening connection portion and the like.

BACKGROUND ART

Conventionally, there have been proposed various systems that prevent occurrence of an electrical accident leading to a fire when a power source-side electric path from a power source side and a load-side electric path directed toward a load that operates with power supply, such as a lighting facility/device, an air conditioning facility/device, a freezing/refrigerating facility/device, or a production facility/device are electrically connected to each other via a power device such as a power receiving and transforming facility, a switch board, a distribution board, an electric lamp board, a power board, a control board, or a junction box, including an electric device such as a main breaker or a leakage breaker.

The applicant of the present application also proposes a "digital electric safety control system" (Patent Literature 1).

The applicant of the present application proposed a digital electric safety control system in Patent Literature 1. Said digital electric safety control system proposed in Patent Literature 1 can prevent occurrence of an electrical accident leading to a fire when a power source-side electric path from a power source side and a load-side electric path directed toward a load that operates with power supply, such as a lighting facility/device, an air conditioning facility/device, a freezing/refrigerating facility/device, or a production facility/device are electrically connected to each other via a power device such as a power receiving and transforming facility, a switch board, a distribution board, an electric lamp board, a power board, a control board, or a junction box, including an electric device such as a main breaker or a leakage breaker. The applicant of the present application calls said digital electric safety control system proposed in Patent Literature 1 as DESCON, and said digital electric safety control system named as DESCON has already implemented.

CITATION LIST

Patent Literature

Patent Literature 1: JP 6732278 B2

SUMMARY OF INVENTION

Technical Problem

The inventor of the present application has further improved the invention described in Patent Literature 1, and has developed a system that automatically performs ON/OFF switching of each of the plurality of loads connected to the load-side electric path, automatically checks a meter for a power usage amount in the load and automatically calculates the power usage amount to save labor, and prevents occurrence of an electrical accident leading to a fire by, for example, detecting bolt looseness in a bolt screw tightening connection portion in the power device, insufficient insertion into a receptacle, and leakage due to dust adhesion in the bolt screw tightening connection portion and the like.

That is, an object of the present invention is to provide a DESCON operation safety system that is a system in which, when a power source-side electric path from a power source side and a load-side electric path directed toward a load that operates with power supply, such as a lighting facility/device, an air conditioning facility/device, a freezing/refrigerating facility/device, or a production facility/device, a receptacle serving as an electric connection portion for supplying power to the load and the like, and the like are electrically connected to each other via a power device such as a power receiving and transforming facility, a switch board, a distribution board, an electric lamp board, a power board, a control board, or a junction box, including an electric device such as a main breaker or a leakage breaker, the system automatically performs ON/OFF switching of each of the loads, automatically checks a meter for a power usage amount in the load and automatically calculates the power usage amount to save labor, and further prevents occurrence of an electrical accident leading to a fire by, for example, detecting bolt looseness in a bolt screw tightening connection portion in the power device, insufficient insertion into a receptacle, and leakage due to dust adhesion in the bolt screw tightening connection portion and the like.

Solution to Problem

[1]
A DESCON operation safety system including:
a power device in which a power source-side electric path from a power source side and a plurality of load-side electric paths respectively directed to a plurality of loads are connected to each other via an electric device disposed in a housing;
a power source ON/OFF switching signal output unit that outputs a power source ON/OFF switching signal that turns ON/OFF power supply to the plurality of loads via the load-side electric paths at a timing preset for the plurality of power source ON/OFF switches disposed respectively in the plurality of load-side electric paths;
an operation/stop state grasping/determining unit that detects that each of the plurality of loads is in an operation/stop state according to the power source ON/OFF switching signal, and grasps and determines the operation/stop state of each of the plurality of loads;

a power charge calculating unit that detects a power usage amount of each of the plurality of loads and calculates a power usage charge charged to each of the loads based on the detected power usage amount of each of the loads;

a load-side electric path state determining unit that constantly acquires information of each of a temperature, a voltage value, a current value, and a resistance value in each of the load-side electric paths from each of a plurality of load-side electric path information detecting units respectively connected to the plurality of load-side electric paths, and determines whether any one of the acquired temperature, voltage value, current value, and resistance value is within an allowable value range preset for each of the load-side electric paths;

a first power cutoff unit that outputs a signal for cutting off power supply via the load-side electric path when the load-side electric path state determining unit determines that any one of the temperature, the voltage value, the current value, and the resistance value acquired from each of the load-side electric path information detecting units is out of the allowable value range preset for each of the load-side electric paths, and the load-side electric path for which the determination has been made is in a power source supply ON state;

a bolt tightening state determining unit that acquires a bolt tightening strength value in each of a power source-side electric path-electric device bolt/screw connection portion between the power source-side electric path and the electric device, a load-side electric path-electric device bolt/screw connection portion between each of the plurality of load-side electric paths and the electric device, and a load-side electric path-power source ON/OFF switch bolt/screw connection portion between each of the plurality of load-side electric paths and the power source ON/OFF switch, and determines whether the acquired bolt tightening strength value is within a preset allowable bolt tightening value range; and a second power cutoff unit that outputs a signal for cutting off power supply via the power source-side electric path-electric device bolt/screw connection portion, the load-side electric path-electric device bolt/screw connection portion, and the load-side electric path-power source ON/OFF switch bolt/screw connection portion for which it has been determined by the bolt tightening state determining unit that the acquired bolt tightening strength value is out of the preset allowable bolt tightening value range.

[2]

The DESCON operation safety system according to claim 1, in which when the allowable value of the resistance value among the allowable values of the temperature, the voltage value, the current value, and the resistance value preset for each of the load-side electric paths is an insulation resistance normal value allowable according to the load connected to the load-side electric path, and an insulation resistance value when the load is in a power source OFF state is lower than the insulation resistance normal value, the load-side electric path state determining unit determines that the resistance value is out of the preset allowable value range.

[3]

The DESCON operation safety system according to [1] or [2], in which the plurality of loads is disposed in a building in which a water facility and a gas using device are disposed, and the DESCON operation safety system further comprising:

a water charge calculating unit that detects a water usage amount in the water facility and calculates a water usage charge charged to the water facility based on the detected water usage amount; and a gas charge calculating unit that detects a gas usage amount in the gas using device and calculate a gas usage charge charged to the gas using device based on the detected gas usage amount.

[4]

The DESCON operation safety system according to [3], in which the power charge calculating unit calculates a power usage charge charged to the entire plurality of loads disposed in the building based on a power usage amount by the entire plurality of loads disposed in the building.

[5]

The DESCON operation safety system according to any one of [1] to [4], including an operation/stop state information providing unit that provides information regarding an operation/stop state of each of the plurality of loads grasped by the operation/stop state grasping/determining unit to an administrator terminal used by an administrator who administers the plurality of loads and a staff terminal used by a staff who is in charge of administration of the plurality of loads.

[6]

The DESCON operation safety system according to [2], including an operation/stop state information providing unit that determines that a leakage current is generated when the load-side electric path state determining unit determines that the resistance value is out of the preset allowable value range, and provides leakage current state occurrence information to an administrator terminal used by an administrator who administers the load connected to the load-side electric path for which the determination has been made, and a staff terminal used by a staff who is in charge of administration of the load connected to the load-side electric path for which the determination has been made.

Advantageous Effects of Invention

The present invention can provide a DESCON operation safety system that is a system in which, when a power source-side electric path from a power source side and a load-side electric path directed toward a load that operates with power supply, such as a lighting facility/device, an air conditioning facility/device, a freezing/refrigerating facility/device, or a production facility/device, a receptacle serving as an electric connection portion for supplying power to the load and the like, and the like are electrically connected to each other via a power device such as a power receiving and transforming facility, a switch board, a distribution board, an electric lamp board, a power board, a control board, or a junction box, including an electric device such as a main breaker or a leakage breaker, the system automatically performs ON/OFF switching of each of the loads, automatically checks a meter for a power usage amount in the load and automatically calculates the power usage amount to save labor, and prevents occurrence of an electrical accident leading to a fire by, for example, detecting bolt looseness in a bolt screw tightening connection portion in the power device, insufficient insertion into a receptacle, and leakage due to dust adhesion in the bolt screw tightening connection portion and the like.

DESCRIPTION OF EMBODIMENTS

<Social Structure in 21th Century and DESCON Operation Safety System>

In the social structure of the 21th century, it is considered that fluidization of movement of a global view and scale in values of information, transportation, economy, and culture is dramatically accelerated due to borderlessness, in particular, a low birth rate and aging in advanced countries are progressing, and it is becoming more difficult to secure human resources of skilled engineers and skilled workers in the economic industry year by year.

With advanced development of introduction of IT and AI in informatization, a change from a real analog life style to digitalization is increasingly competitive in the world, and along with this, online shopping has become mainstream in the society instead of real stores due to digitalization as a trend of consumers.

Along with digitalization, in the social infrastructure, a demand for power of an energy source is accelerated due to an increase in the number of construction floors of information centers, distribution centers, commercial facilities, composite facilities, and the like, a power consumption amount and the number of items of robots, computers, and electrical facilities are increased, and a shortage of human resources in electrical engineers is progressing. For example, it is considered that a power source ON start operation as start of work of an electric facility of a building facility and a power source OFF stop operation at an end of the work are still performed by human power.

<Power Saving by Automation of Power Source ON/OFF of Electric Facility by DESCON Operation Safety System>

For example, it is considered that an electrical engineer or an administrator conventionally performs power source ON work at the time of starting business, opening a store, or starting work, and power source OFF work at the time of ending business, closing a store, or ending work for lighting of an electric lamp facility of power which is an energy source of a building facility, a receptacle and the like, air conditioning/ventilation of a power facility, an elevator, a shutter, an automatic door, a refrigerating/freezing facility, a process device for producing products, a kitchen device, conveyance and storage in a distribution center, an unpacking device, a power source of a computer, and the like.

In this case, for example, a large-scale commercial facility has a large area and three or four floors. It is necessary to turn on lighting and to operate an air-conditioning/ventilation facility 60 minutes before opening or 30 minutes before opening for preparation work before opening, and to turn ON a power source for each area, for each work room in the kitchen, and for each floor even on the same floor as a customer elevator or the like 10 minutes before closing. Note that it is necessary to check whether the power source ON facility is normally operating with a control panel or the like by visual inspection on site by human administration.

Also in a distribution center and the like, at the times of starting and ending work, it is necessary to perform power source ON work and power source OFF work at the ending time for lighting, air conditioning, ventilation, a conveyor, picking, storage, an elevating lifter for unpacking, and the like. Note that it is considered that it is necessary to check whether or not a power source device of a facility device concerned normally operates in a factory operating for 24 hours.

In the DESCON operation safety system, a server device including a computer constituting this system previously inputs and stores store opening time and business starting time of a building concerned in a program, for example, inputs and stores lighting time of an electric lamp facility, operating time of a facility device, store closing time, business ending time, and the like for each floor, each area, each room, each facility, and the like in a program, and a power source is turned ON by a magnet switch, a DESCON switch, or the like of a facility concerned, for example, disposed in a distribution board and a control board for each floor, each area, each room, each facility, and the like to operate the distribution board and the control board concerned, thereby enabling system operation that does not require human work.

When a building concerned has ended its business or is closed, the magnet switch or the DESCON switch disposed in the distribution board and the control board is in a power source OFF state. A system is thereby operated in which turning off of lighting, stopping of a facility concerned, closing of a shutter, or the like does not require human operation. In the DESCON operation safety system, lighting time of an electric lamp facility, operating time of a facility device, store closing time, business ending time, and the like are stored in advance for each floor, each area, each room, each facility, and the like. A power source can be thereby turned ON and OFF without requiring a human operation at a predetermined time. For example, in opening and closing of a shutter at an entrance or an exit of a building, when the DESCON operation safety system performs instruction control to lower the shutter, it is possible to perform control to automatically lower the shutter at a point of time when a predetermined time is reached while continuously broadcasting that a time when the shutter is closed is approaching from a speaker disposed in the vicinity of the shutter and giving notification to the vicinity of the shutter by voice from a predetermined time, for example, two to five minutes before the closing time. In addition, also when the shutter is opened at a store opening time, it is possible to perform control to open the shutter by automatically raising the shutter at a point of time when a predetermined time is reached while continuously broadcasting that a time when the shutter is opened is approaching from a speaker disposed in the vicinity of the shutter and giving notification to the vicinity of the shutter by voice from a predetermined time, for example, one to three minutes before the opening time.

In the DESCON operation safety system, it is necessary for a skilled engineer or an administrator to visually check air conditioning/ventilation, an elevator, a shutter, a manufacturing process, conveyance, picking, a storage lifter, and the like on site, on a control board, and the like for each floor, each area, each room, and the like with respect to turning on of lighting of the facility and operation of the facility device, which requires considerable labor and securing of necessary personnel. However, it is possible to detect, collate, and determine whether or not turning on of lighting of an electric lamp facility or operation stop of the facility device by turning off lighting normally operates according to a program for set time, each floor, each area, each room, and the like by the program.

In the DESCON operation safety system, it is possible to transmit a voice, an image, or a numerical value to a personal computer, a tablet, or a smartphone of a related person as to whether the turning on and turning off of the electric lamp facility and the operation and stop states of the power facility are normal or abnormal, and it is possible to perform determination control such that the related person can remotely monitor and check a state of the building facility in a fully automatic manner. In the DESCON operation safety system, a digital camera is disposed on a predetermined floor, an area, a place, a room, a position, or the like together with a power receiving and transforming facility, a switch board, a distribution board, each facility, or the like, and it is possible to arbitrarily perform determination control such that a related person can remotely monitor and check a state in a fully automatic manner at a predetermined time and when necessary.

In the DESCON operation safety system, a digital camera is disposed in a predetermined place, a voice or an image is transmitted to a personal computer, a tablet, or a smartphone of a related person as to whether or not a power source ON or OFF of each facility device normally operates according to a program, and remote monitoring check and recording can be performed.

<Meter Check for Electricity/Gas/Water Usage Amount as Utility Cost, Calculation of Usage Charges, and Charge to Each Department and Business Partner by DESCON Operation Safety System>

In the DESCON operation safety system, a server device including a computer constituting this system checks a meter for a usage amount of a power amount, a gas amount, a water amount, or the like consumed by each floor, each area, each room, each facility, or the like of a building concerned, each business partner, each department, or the like, calculates a unit price, a charge, and a consumption tax, transmits a voice, an image, or a numerical value to a personal computer, a tablet, or a smartphone of an office of the building, each department, a business partner, and a head office. In addition, the server device is connected to a printer, for example, a charge amount is calculated with a usage amount at an end of a month and is printed by a connected printer of a destination, and charge can be performed at a beginning of a month.

In the DESCON operation safety system, there is a program that calculates a consumption tax prescribed by law, a usage amount and a unit price of a building concerned, a usage amount and a unit price of each business partner, and a usage amount and a unit price of each department using a meter reading power amount kW/h and a unit price of a power meter, a meter reading gas amount $m^3/h$ and a unit price of a microcomputer gas meter or the like, and a meter reading water amount $m^3/h$ and a unit price of an electronic water meter or the like. A charged amount is calculated at a prescribed unit price, and a consumption tax is added to calculate a correct charged amount. A voice, an image, or a numerical value is transmitted to the personal computer, the tablet, or the smartphone, and printed by a connected printer. It is possible to save labor for all of human cost and shipping cost conventionally required for checking a meter of a power amount, a gas amount, or a water amount as utility cost for each floor, each area, each room, each facility, and the like, calculating a bill to create a document, and sending the bill by mail or the like. That is, as described above, by processing using a computer and a network using a computer program, electronic information is delivered to a personal computer, a tablet, or a smartphone of a destination, and the electronic information is delivered as electronic information that can be printed in a form of a bill. It is thereby possible to save labor for all of human cost and shipping cost conventionally required for checking a meter, calculating a bill to create a document, and sending the bill by mail or the like.

The DESCON operation safety system is characterized by including a unit that checks a meter of a power amount, a gas amount, or a water amount of the building concerned, the tenant, or the business partner for each department, each facility, and the like, automatically transmits a usage amount, a unit price, and a charged amount including a consumption tax for each at a predetermined time, transmits a voice, an image, or a numerical value indicating whether the destination has received and checked the charged usage amount and the charged amount to a personal computer, a tablet, or a smartphone of a related person through VPN communication, and transmits a notification of confirmation to the sender when the related person has received the charged usage amount and the charged amount. The related person who has received the charged usage amount and the charged amount can check a state in which a meter is checked for each floor, each area, each room, each facility, and the like with image information via a digital camera disposed at a predetermined position in the vicinity thereof.

A control unit that transmits a voice, an image, or a numerical value for checking the charged amount to the destination using a personal computer, a tablet, or a smartphone when the destination does not check the charged usage amount of utility cost, the unit price, the amount of money, and the charged amount including a consumption tax can be included.

In the DESCON operation safety system, the destination to which the usage amount, the unit price, the amount of money, and the total amount including a consumption tax are charged can automatically perform printing with a printer.

In the DESCON operation safety system, a digital camera is disposed in each checking meter, and an image is recorded. A voice or an image is thereby transmitted to a personal computer, a tablet, or a smartphone of a related person as to whether or not a checking meter for a power amount, a gas amount, or a water amount normally operates, and remote monitoring check and recording can be performed.

<Characteristics of DESCON Operation Safety System>

Due to worldwide spread of socioeconomics and development of information communication, transportation, and the like, a flow of people and objects is sped up, and a living style of people is also digitized due to expansion of a highly fluidized digital system instead of the real world, such as information centers, distribution centers, highly complex buildings, commercial facilities, factories, offices, high-rise apartments, and hospital highly advanced medical buildings. A demand for power as an energy source of building facilities and items such as electric devices and electrical appliances are remarkably widened, and it is considered that a power consumption amount is increased in proportion to the industrial structure, and burning and an electric fire accident are increased due to factors of electric facilities.

It is considered that one of direct factors of the electric fire accident is aging of a tightening/insertion portion of a bolt, a connector, a screw, and the like of connection fittings of an electric facility such as a switch board, a distribution board, a control board, a trunk line, a branch trunk line, or a wiring line of a high pressure power receiving and transforming facility and a low pressure facility, a terminal receptacle, or a switch insertion connection fitting, metal fatigue, breakage of an insulating material of a trunk line or a branch trunk line wiring line, a tracking phenomenon, an accident of a product or an electrical appliance product, or the like.

Among the factors of the electric fire accident and the burning accident described above, it has a high occurrence rate, it is structurally difficult to find it because it is constantly hidden by a cabinet, it is generally observed over about four to six years, and for example, the occurrence rate increases after five to seven years or more. For example, bolts, connectors, taps, screws, and the like of electrical connection fittings of a power receiving and transforming facility, a switch board, a distribution board, a control board, a terminal receptacle, and an electrical product are expanded due to heat generation at the time of power source ON/OFF or at the time of energization of an electrical connection appliance portion, and are loosened or have a separation distance such as a gap due to temperature fall at the time of power source OFF and contraction or the like of a fitting portion. Arc of a current, a tracking phenomenon, or the like occurs due to the loosening, the gap, and the separation distance. The fitting generates heat and becomes a high temperature due to melting of an insulating material, and the power receiving and transforming facility, the switch board, the distribution board, the control board, the terminal receptacle, the trunk line, the branch trunk line, the wiring line, and the like burn. This is considered to be a factor of the electric fire accident.

It is considered that in general, dust attached to the power receiving and transforming facility, the switch board, the distribution board, the control board, the terminal receptacle, and the like, a tracking phenomenon, or the like causes (+) and (−) in separation of an insulating function of (+) and (−) of an electrode to be energized, a connection fitting of the dust attachment portion causes leakage and ignition, this portion generates heat and becomes a high temperature, and an insulating material of a trunk line, a branch trunk line, or a wiring line melts and burns to cause a fire.

The DESCON operation safety system can perform control such that a normal current value, a normal voltage value, and a normal temperature value of a board concerned are input and stored, when an insulation function of (+) and (−) of an electrode is lowered and energization is performed due to loosening of a connection fitting such as a bolt, a connector, or a screw of the power receiving and transforming facility, the switch board, the distribution board, the control board, and the terminal receptacle, generation a separation distance such as a gap, or attachment of dust to a portion concerned, a current value and a voltage value protrude, and when an abnormal numerical value indicating temperature rise or the like is detected, a voice, an image, or a numerical value is transmitted to a personal computer, a tablet, or a smartphone of a related person, and a circuit concerned is automatically cut off by a magnet switch, a DESCON switch, a DESCON breaker, a leakage breaker, or the like.

In the DESCON operation safety system, for metal connection of a trunk line of a high pressure power receiving and transforming facility of a building, for example, bolt diameters of bolts M14 to M24 and the like made of steel are generally used, and M4 to M24 and the like are generally used as torque strength categories of a maximum bolt tightening strength.

For example, in a case of a metal-connected steel bolt M16 of a high pressure power receiving and transforming facility, a reference tightening torque of the bolt is about 180 N·m in a case of a strength category 6.8, and the value of the strength is within an allowable value without loosening of the bolt or a separation distance such as a gap.

For example, in a case of a hexagonal bolt diameter M8, a steel bolt of a switch board and a distribution board of a low voltage facility has a reference tightening torque of about 5.19 N·m in a strength category 6.8, and the value of the strength is within an allowable value without loosening of the bolt or a separation distance such as a gap.

As a metal connection screw of a branch trunk line and a wiring line of an electric lamp board, a power board, a control board, and a terminal receptacle of a low voltage facility, for example, a screw having a diameter of about M4 to M24 is mainly disposed, and the screw has a reference tightening torque of about 2.57 N·m in a strength category 6.8 of M4. As for the value of the strength, a tolerance of the tightening torque in looseness of a bolt and a screw, a gap, and the like is generally within an allowable value, for example, about ±5 to +10%.

The DESCON operation safety system includes a determination unit that receives an input and stores, as normal reference values, current values of a high pressure power receiving and transforming facility, a low pressure switch board, a distribution board, a control board, and a terminal receptacle, voltage values thereof, temperatures thereof, and insulation resistance measurement values thereof when the power source is turned OFF.

The DESCON operation safety system includes a unit that detects a temperature rise and a leakage current in a connection wiring line between a switch board, a distribution board, a control board, and the like of the high pressure power receiving and transforming facility and a low pressure facility, and a terminal receptacle and an electrical appliance due to insulation failure between a connection fitting of a trunk line and a branch trunk line of the switch board, the distribution board, and the control board, the terminal receptacle, or the electrical appliance, and a combustible such as paper, cloth, dirt, or dust, a gap of a connection portion, looseness, DESCON of a branch trunk line wiring line, breakage of a cord insulating member, and the like, detects an ammeter and a temperature sensor disposed in the power receiving and transforming facility, the switch board, the distribution board, and the control board, and determines that a leakage current is generated due to a decrease in insulation resistance when a current value and a temperature for each hour of 24 hours for each month of January to December of the year, during business energization and during power source OFF significantly increase from previously stored numerical values, and an insulation resistance value when the power source is turned OFF is lower than an insulation resistance normal value stored in advance.

For example, an insulation resistance value of a low voltage indoor wiring line is 0.1 MΩ when a working voltage of an electric path is classified into 300 V or less and a ground voltage is 150 V or less, the insulation resistance value is 0.2 MΩ when the working voltage of the electric path is classified into 300 V or less and the ground voltage exceeds 150 V, and the insulation resistance value is 0.4 MΩ when the ground voltage exceeds 300 V.

It is possible to set these insulation resistance values as allowable normal values, to determine that a leakage situation occurs when a detected insulation resistance value is lower than these values, and to notify an administrator terminal used by an administrator and a staff terminal used by a staff of the leakage situation.

The DESCON operation safety system includes a control unit that transmits a voice, an image, or a numerical value to a personal computer, a tablet, or a smartphone of a related person in real time when a leakage current is generated, and automatically cuts off a magnet switch, a DESCON switch, or a DESCON breaker of a circuit concerned.

The DESCON operation safety system includes a unit that transmits a voice, an image, or a numerical value to a personal computer, a tablet, or a smartphone of a related person in real time when the temperature of a connection fitting of a trunk line and a branch trunk line of the power receiving and transforming facility, the switch board, the distribution board, and the control board, the terminal receptacle, or the electrical appliance rises.

The DESCON operation safety system can perform control to automatically cut off a magnet switch, a DESCON switch, a DESCON breaker, or the like of the power receiving and transforming facility, the switch board, the distribution board, and the control board which have generated the leakage current and have caused the temperature rise.

The DESCON operation safety system includes a unit that receives an input and stores, for example, that a reference tightening torque of a strength category 6.8 in a case of a metal-connected steel bolt M16 of the high pressure power receiving and transforming facility is about 180 N·m, and a reference tightening torque of a strength category 6.8 in a case of a hexagonal bolt diameter M8 of a switch board and a distribution board of a low pressure facility is about 5.19 N·m, and transmits a voice, an image, or a numerical value to a personal computer, a tablet, or a smartphone of a related person in real time for each building concerned, each floor, each area, each room, and each facility when, for example, the related person inputs a numerical value for each building, each floor, each area, each room, and each facility at daily, weekly, monthly, and annual inspections, the numerical value is collated with the stored numerical value, and for example, the tightening torque decreases.

The DESCON operation safety system includes a control unit that automatically cuts off a magnet switch, a DESCON switch, or a DESCON breaker between the power receiving and transforming facility concerned, the switch board, the distribution board, and the control board, and the circuit concerned when the current value, the voltage value, the temperature, and the insulation resistance measurement value when the power source is turned OFF are significantly abnormal values as compared with the normal current value stored, the normal voltage value stored, the normal temperature stored, and the normal insulation resistance measurement value stored when the power source is turned OFF.

The DESCON operation safety system includes a unit that transmits a voice, an image, or a numerical value to a personal computer, a tablet, or a smartphone of a related person in real time, characterized by performing detection and collation, and determining an abnormal decrease, for example, in a case where a reference tightening torque of a strength category 6.8 in a case of a metal-connected steel bolt M16 of the high pressure power receiving and transforming facility is about 180 N·m, and a reference tightening torque of a strength category 6.8 in a case of a hexagonal bolt diameter M8 of a switch board and a distribution board of a low pressure facility is about 5.19 N·m, when the tightening torque decreases in the daily, weekly, monthly, and annual inspections as regular inspections.

The DESCON operation safety system includes a control unit that automatically cuts off, for example, a magnet switch, a DESCON switch, or a DESCON breaker of a circuit concerned when the tightening torque numerical value decreases.

The DESCON operation safety system includes a unit in which, for example, in a case where a reference tightening torque of a strength category 6.8 in a case of a metal-connected steel bolt M16 of the high pressure power receiving and transforming facility is about 180 N·m, and a reference tightening torque of a strength category 6.8 in a case of a hexagonal bolt diameter M8 of a switch board and a distribution board of a low pressure facility is about 5.19 N·m, when as a connection screw of a switch board, a distribution board, a control board, a terminal receptacle, and the like of a low voltage facility, for example, a screw having a diameter of about M4 to M20 is mainly used, a reference tightening torque of the strength category 6.8 is about 2.57 to 357 N·m, and the value of the strength is a value without looseness of a bolt, screw, a connector, or the like, or a separation distance such as a gap, the system stores the value, and stores that the value is within an allowable value without looseness or a separation distance such as a gap.

The DESCON operation safety system includes a unit that transmits a voice, an image, or a numerical value to a personal computer, a tablet, or a smartphone of a related person in real time in a case where a gap or a separation distance of a tap or a connector of an electrical connection fitting of a trunk line and a branch trunk line wiring line is a normal clearance, for example, having a diameter of about 1 M/M or less, in which an electrical spark does not occur, when, as a current value, a voltage value, a temperature, and an insulation resistance measurement value when the power source is turned OFF, of a magnet switch, a DESCON switch, or a DESCON breaker of a circuit switch of a power receiving and transforming facility concerned, a distribution board, and a control board at this time, for example, a current value, a voltage value, a temperature, and an insulation resistance measurement value when the power source is turned OFF for morning and afternoon during business hours, night, late night, and early morning during closing hours for every hour from 1:00 to 24:00 and for each month of April to March of spring, summer, autumn, and winter are input and stored, and the current value, the voltage value, the temperature, and the like significantly increase, and the insulation resistance value decreases as compared with the current value, the voltage value, the temperature, and the insulation resistance measurement value when the power source is turned OFF, stored at daily, weekly, monthly, and annual inspections as regular inspections.

The DESCON operation safety system includes a unit that determines that a leakage current is generated and transmits a voice, an image, or a numerical value to a personal computer, a tablet, or a smartphone of a related person in real time when detecting a decrease in numerical value and an insulation resistance value at the time of tightening bolts, screws, connectors, and the like of a power receiving and transforming facility, a switch board, a distribution board, a control board, a junction box, a receptacle, an electrical appliance, a process manufacturing machine, a conveyance facility, and the like, and a decrease in insulation resistance value at the time of turning ON and OFF the power source before and after operation of the power receiving and transforming facility, the switch board, the distribution board, the control board, the junction box, the receptacle, the electrical appliance, the process manufacturing machine, the conveyance facility, and the like.

The insulation resistance value is 0.1 MΩ, for example, when a low voltage circuit has a voltage of 300 V or less and the ground voltage is 150 V or less, the insulation resistance value is 0.2 MΩ or more or the like when the ground voltage exceeds 150 V, and the insulation resistance value is 0.4 MΩ or the like when the ground voltage exceeds 300 V. The DESCON operation safety system is characterized by including a control unit that automatically cuts off, for example, a magnet switch, a DESCON switch, or a DESCON breaker of a circuit concerned when the insulation resistance is equal to or less than an allowable value. The DESCON operation safety system is characterized by including a control unit that determines 6 MΩ or more and the like as an allowable value when a high voltage circuit has a voltage of 600 V or more.

In the DESCON operation safety system, a digital camera is disposed in the power receiving and transforming facility, the switch board, the distribution board, the control board, a helmet of an inspector, or the like, and an image is recorded. A voice or an image is thereby transmitted to a personal computer, a tablet, or a smartphone of a related person, and remote monitoring check and recording can be performed.

The DESCON operation safety system includes a unit that receives an input and stores a predetermined current value, voltage value, temperature, and insulation resistance value of each of the facilities, determines whether each of the facilities is operating normally or abnormally using the detected current value, voltage value, and temperature and the insulation resistance value when the power source is turned OFF before and after opening a store and before and after starting work, and transmits a voice, an image, or a numerical value periodically and at the time of abnormality to a personal computer, a tablet, or a smartphone of a related person.

<Embodiment of DESCON Operation Safety System>

An embodiment of a DESCON operation safety system will be described with reference to FIGS. 1 to 4.

Figure 1:
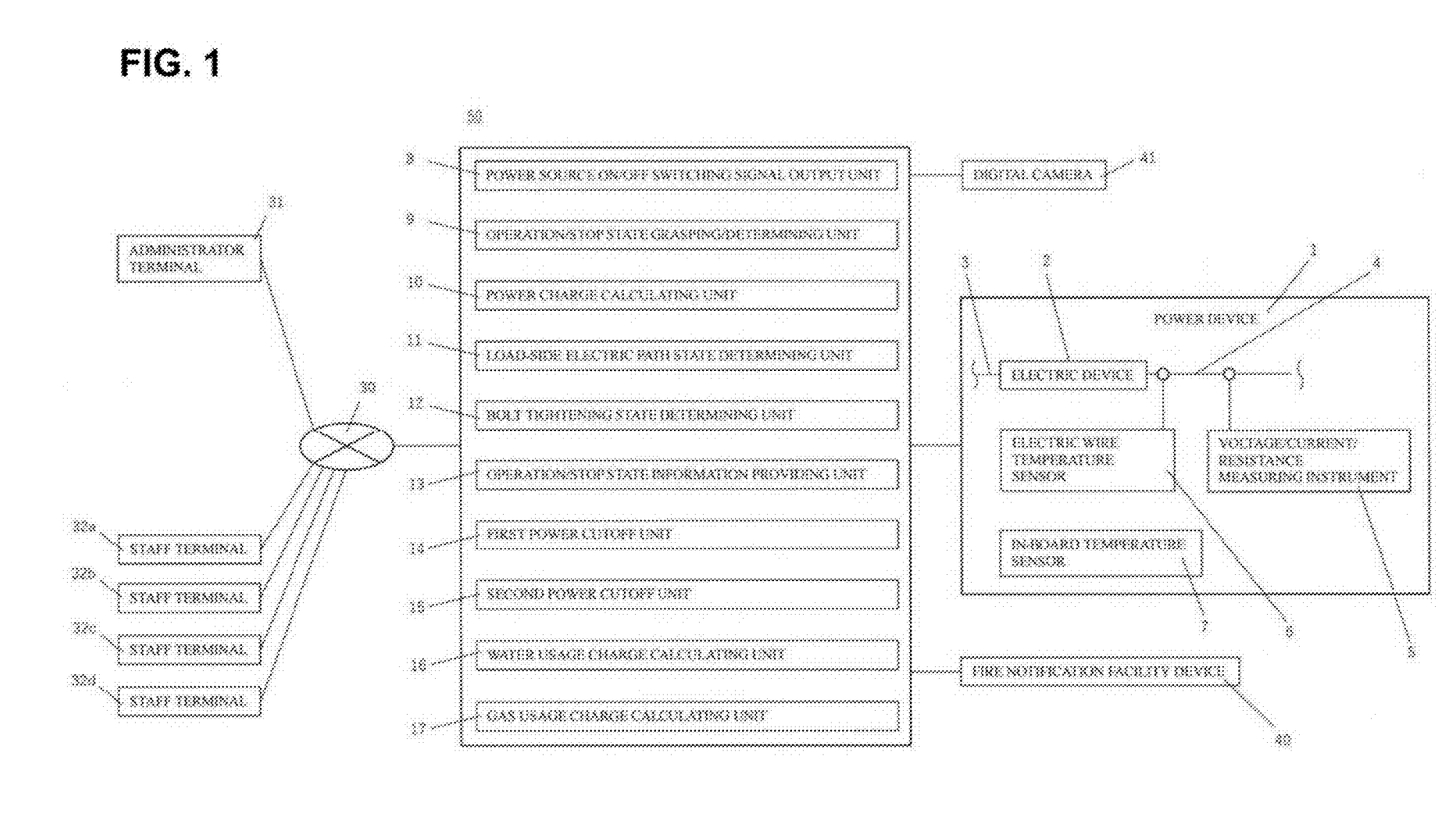
FIG. 1 is a conceptual diagram for explaining a configuration of an embodiment of a DESCON operation safety system according to the present invention.

A DESCON operation safety system 50 illustrated in FIG. 1 includes a power device 1, a power source ON/OFF switching signal output unit 8, an operation/stop state grasping/determining unit 9, a power charge calculating unit 10, a load-side electric path state determining unit 11, a bolt tightening state determining unit 12, an operation/stop state information providing unit 13, a first power cutoff unit 14, a second power cutoff unit 15, a water usage charge calculating unit 16, and a gas usage charge calculating unit 17.

Figure 2:
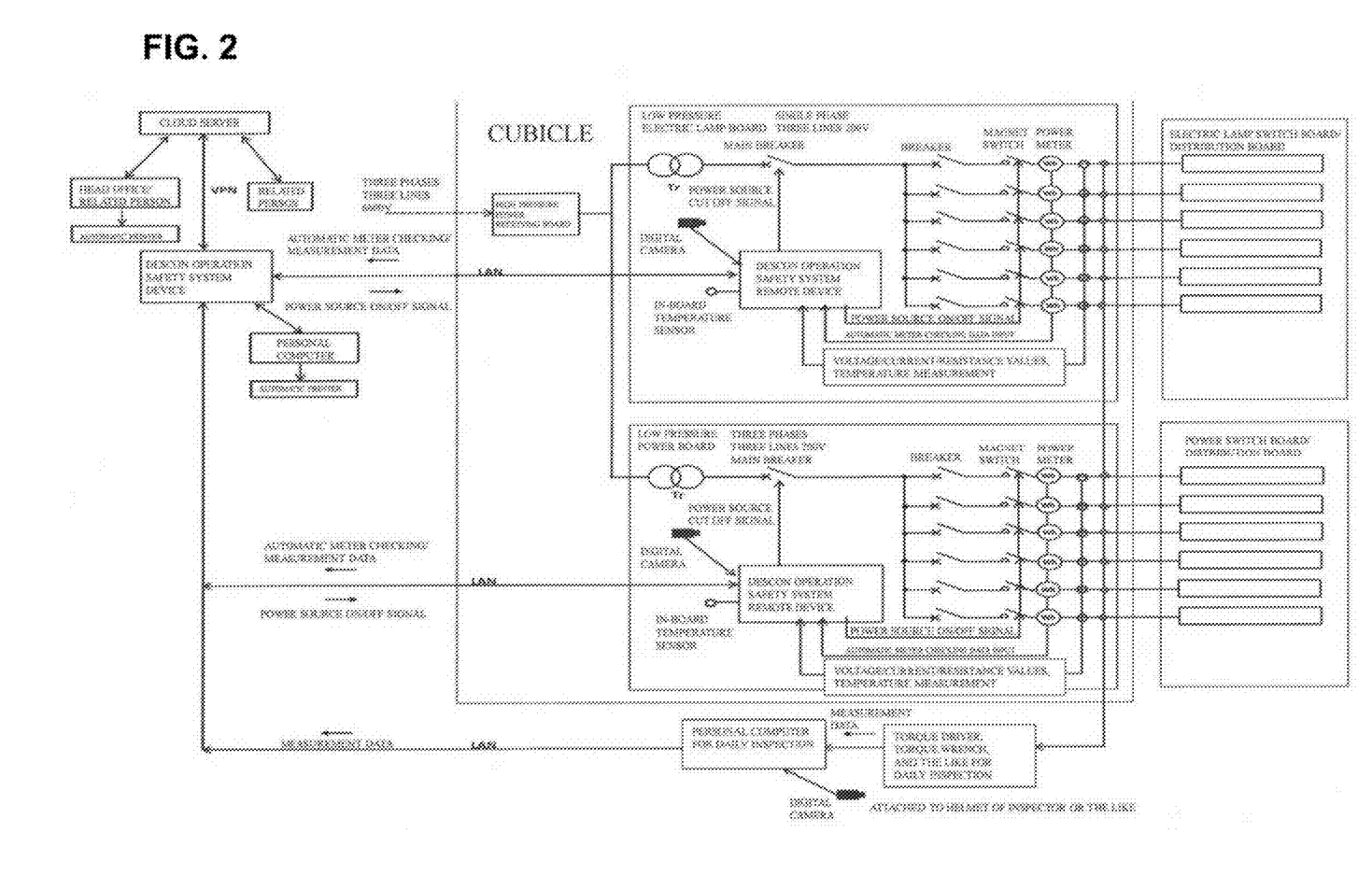
FIG. 2 is a block diagram for explaining an example of a system configuration of the embodiment of the DESCON operation safety system according to the present invention.
Figure 3:
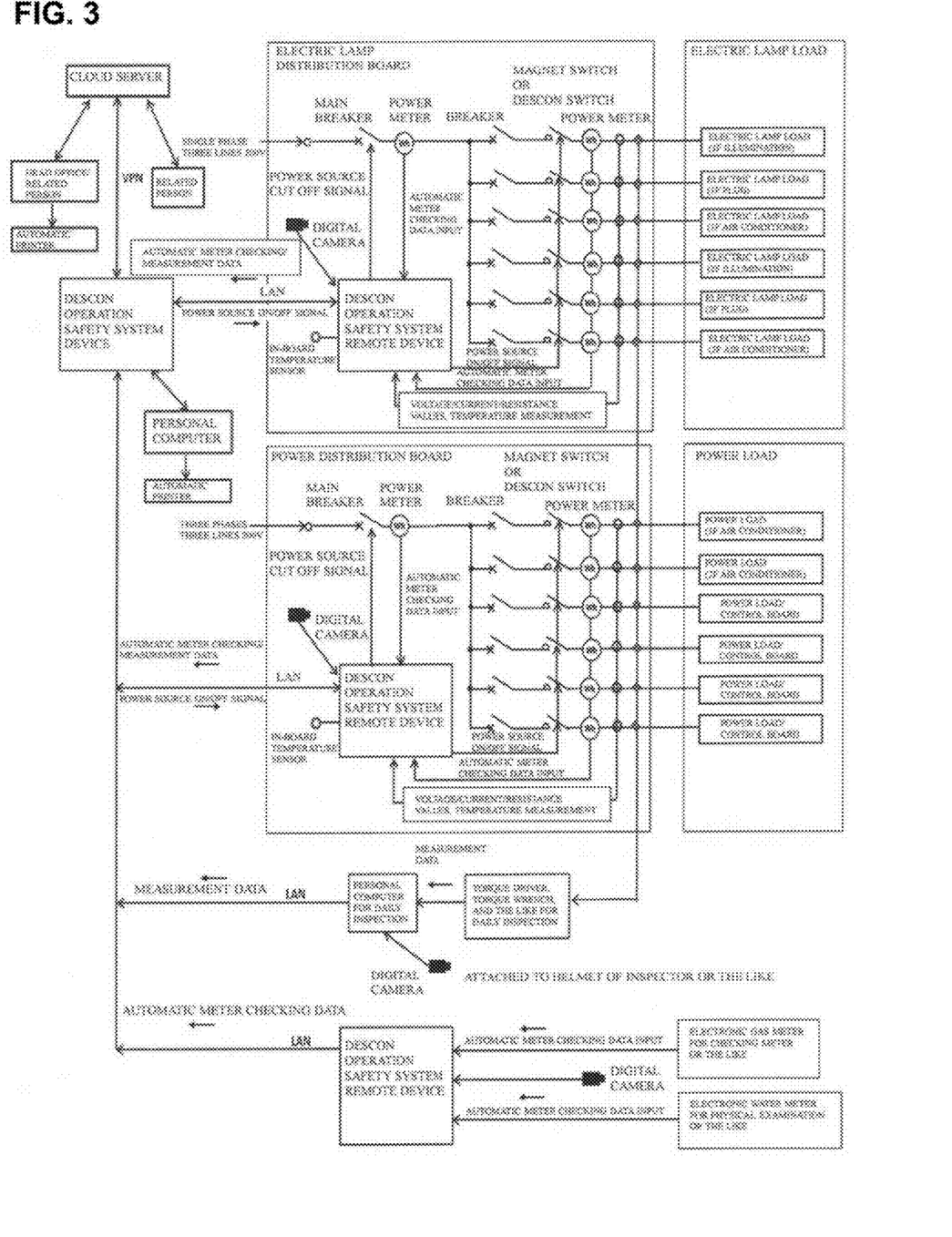
FIG. 3 is a block diagram for explaining another example of the system configuration of the embodiment of the DESCON operation safety system according to the present invention.

In the power device 1, a power source-side electric path 3 from a power source side and a plurality of load-side electric paths 4 directed to a load are electrically connected to each other via an electric device 2 disposed in a housing. Although only one load-side electric path 4 is illustrated in FIG. 1, as illustrated in FIGS. 2 and 3, a plurality of load-side electric paths respectively directed to the plurality of loads from a main breaker as the electric device 2 extends. Examples of the power device 1 include various power receiving and transforming facilities, a switch board, a distribution board, an electric lamp board, a power board, a control board, a remote control device board, an extension cord between a switch board or a distribution board and a device or an instrument, and a junction box for branch wiring line connection of a wiring line.

The electric device 2 is disposed in a housing constituting the above-described power device 1, and electrically connects the power source-side electric path 3 from a power source side and the plurality of load-side electric paths 4 directed to a load to each other. Examples of the electric device 2 include a main breaker and a leakage breaker.

The load to which each of the load-side electric paths 4 is directed is a load that operates with power supply, such as a lighting facility/device, an air conditioning facility/device, a freezing/refrigerating facility/device, or a production facility/device, and examples thereof include a power/electric apparatus/device that operates by receiving power supply, such as a motor, an elevator, an air conditioning facility, a ventilation facility, a lighting facility, a refrigerating/freezing case, a refrigerator/freezer, a measuring instrument, a computer device, a monitoring camera, a medical device, or a communication apparatus, and also include a power/electric apparatus/device that is used by being disposed regardless of inside or outside a building or the like, and a power/electric apparatus/communication apparatus/device that is used by being disposed in a vehicle/moving unit such as a train, a car, an aircraft, or a ship.

In the vicinity of the power device 1, a digital camera 41 that captures an image of the power device 1 constantly or when receiving a capturing start instruction input is disposed.

The power source ON/OFF switching signal output unit 8 outputs a power source ON/OFF switching signal for turning ON/OFF power supply to each of the plurality of loads via the load-side electric path 4 at a timing preset with respect to the plurality of power source ON/OFF switches respectively disposed in the plurality of load-side electric paths 4, indicated as a magnet switch in FIG. 2 and a magnet switch or a DESCON switch in FIG. 3.

For example, a device including a computer constituting the DESCON operation safety system and indicated as a cloud server in FIGS. 2 and 3 previously receives an input and stores store opening time and business starting time of a building administered by the DESCON operation safety system, for example, for each floor, each area, each room, each facility, and the like, and receives an input and stores data of lighting time of an electric lamp facility, operating time of a facility device, or the like, and receives an input and stores data of store closing time, business ending time, or the like. A distribution board concerned or a control board concerned is operated or stopped to operate by turning ON or OFF a power source by a power source ON/OFF switch (a magnet switch, a DESCON switch, or the like) of a facility concerned, disposed in the distribution board or the control board, thereby enabling administration that does not require human work.

The operation/stop state grasping/determining unit 9 detects that each of the plurality of loads is in an operation/stop state according to the power source ON/OFF switching signal, and grasps and determines the operation/stop state of each of the plurality of loads.

The load (for example, an electric lamp load (1F illumination), an electric lamp load (1F receptacle), a power load (1F air conditioner), a power load (2F air conditioner), and a power load/control board in FIG. 3) to which each of the load-side electric paths 4 is connected can include an operation/stop state notification unit that detects an operation state of each of the loads and performs notification and output of a state (operation state or stop state) of each of the loads to a device including a computer constituting the DESCON operation safety system and indicated as a cloud server in FIGS. 2 and 3 via a wired or wireless network.

The operation/stop state grasping/determining unit 9 detects that each of the plurality of loads is in an operation/stop state according to the power source ON/OFF switching signal based on the information (information regarding an operation state of each of the loads) acquired from the operation/stop state notification unit disposed in each of the loads, and grasps and determines the operation/stop state of each of the plurality of loads.

For example, when receiving a signal indicating an operation state from a load connected to the load-side electric path 4 in which a power ON/OFF switch (a magnet switch or a DESCON switch) to which a switching signal from OFF to ON is output by the power source ON/OFF switching signal output unit 8 is disposed, the operation/stop state grasping/determining unit 9 determines that the load is normally operating.

Meanwhile, when receiving a signal indicating an operation state from a load connected to the load-side electric path 4 in which a power ON/OFF switch (a magnet switch or a DESCON switch) to which a switching signal from ON to OFF is output by the power source ON/OFF switching signal output unit 8 is disposed, or receiving a signal indicating a non-operation state from a load connected to the load-side electric path 4 in which a power ON/OFF switch (a magnet switch or a DESCON switch) to which a switching signal from OFF to ON is output by the power source ON/OFF switching signal output unit 8 is disposed, the operation/stop state grasping/determining unit 9 determines that the load is not normally operating.

The operation/stop state information providing unit 13 provides information regarding an operation/stop state of each of the plurality of loads grasped by the operation/stop state grasping/determining unit 9 to an administrator terminal 31 used by an administrator who administers the plurality of loads and a staff terminal 32a, 32b, 32c, 32d used by a staff who is in charge of administration of the plurality of loads via a wired or wireless network.

The administrator terminal 31 can be constituted by a personal computer or the like including an image information display unit such as a monitor. The staff terminal 32a, 32b, 32c, 32d can be constituted by a portable terminal such as a smartphone in which an application for system operation of the present invention is downloaded.

As described above, only when the operation/stop state grasping/determining unit 9 determines that a load is not normally operating, the operation/stop state information providing unit 13 can provide information regarding the operation/stop state of the load (information indicating that the load is not normally operating) to the administrator terminal 31 used by the administrator who administers the load and the staff terminal 32a, 32b, 32c, 32d used by a staff who is in charge of administration of the load.

In this case, it is also possible to dispose a digital camera in the vicinity of each of the loads, to acquire image information and video information acquired by the digital camera by a device including a computer constituting the DESCON operation safety system and indicated as a cloud server in FIGS. 2 and 3 via a wired or wireless network, and to provide video information of a load determined as "not normally operating" at that time to the administrator terminal 31 and the staff terminal 32a together.

The power charge calculating unit 10 detects a power usage amount of each of the plurality of loads, and calculates a power usage charge charged to each of the loads based on the detected power usage amount of each of the loads.

This can be in such a form that, for example, as illustrated in FIGS. 2 and 3, a power usage amount of each of the loads is detected by disposing a power meter in each load-side electric path 4 that supplies power to each of the loads, the power usage amount is acquired by a device including a computer constituting the DESCON operation safety system and indicated as a cloud server in FIGS. 2 and 3 via a wired or wireless network, or the power usage amount of each of the loads is detected by disposing a power meter in each of the loads themselves, and the power usage amount is acquired by a device including a computer constituting the DESCON operation safety system and indicated as a cloud server in FIGS. 2 and 3 via a wired or wireless network, and the power charge calculating unit 10 detects a power usage amount of each of the plurality of loads based on the acquired power amount, and a power usage charge charged to each of the loads is calculated based on the detected power usage amount of each of the loads.

When the plurality of loads described above is disposed in a building, the power charge calculating unit 10 can calculate a power usage charge charged to the entire plurality of loads disposed in the building based on a power usage amount by the entire plurality of loads disposed in the building. In this case, for example, a power meter disposed immediately after a main breaker in FIG. 3 can detect a power usage amount of the entire plurality of loads disposed in the building.

That is, in the DESCON operation safety system of the present embodiment, the server device including a computer constituting this system can calculate a power usage charge and a consumption tax from a meter checking result of a power amount consumed by each floor, each area, each room, each facility, and the like of a building in which a plurality of loads is disposed, each business partner, each department, and the like, and a unit price of power charge, and the power charge calculating unit 10 can calculate a power charge of the building, a tenant, a business partner, or the like for each office of the building, each department, and each business partner. In the DESCON operation safety system of this embodiment, the power charge calculated by the power charge calculating unit 10 can be provided, as information, from a server device including a computer constituting this system via a wired or wireless network to the administrator terminal 31 (a personal computer, a tablet, a smartphone, or the like of a head office) of a business partner or the like. In this case, the power charge can be provided as electronic information that can be printed in a form of a bill on the administrator terminal 31 (a personal computer, a tablet, a smartphone, or the like of a head office) of a business partner or the like.

The load-side electric path state determining unit 11 constantly acquires information of each of a temperature, a voltage value, a current value, and a resistance value in each of the load-side electric paths 4 from each of a plurality of load-side electric path information detecting units (an electric wire temperature sensor 6 and a voltage/current/resistance measuring instrument 5 illustrated in FIG. 1) respectively connected to the plurality of load-side electric paths 4, and determines whether any one of the acquired temperature, voltage value, current value, and resistance value is within an allowable value range preset for each of the load-side electric paths 4.

The first power cutoff unit 14 outputs a signal for cutting off power supply via the load-side electric path 4 when the load-side electric path state determining unit 11 determines that any one of the temperature, the voltage value, the current value, and the resistance value acquired from each of the load-side electric path information detecting units is out of an allowable value range preset for each of the load-side electric paths 4 and the load-side electric path 4 for which the determination has been made is in a power source supply ON state.

An electric wire temperature value, a voltage value, a current value, and a resistance value allowable according to each of the loads to which the load-side electric path 4 is connected are preset. For example, the electric wire temperature value, voltage value, current value, and resistance value are different depending on a case where the load is an air conditioning device, a case where the load is a motor, a case where the load is a precision device such as a computer, a case where the load is a medical device, and the like. When this allowable value is exceeded, damage to a device, malfunction, or the like may occur. Therefore, load-side electric path monitoring temperature, voltage, current, and resistance values are preset according to a load to which the load-side electric path 4 is connected, and comparison therewith is performed by the load-side electric path state determining unit 11.

When insulation failure between a connection fitting of a trunk line and a branch trunk line of the power receiving and transforming facility, the switch board, the distribution board, and the control board, the terminal receptacle, or the electrical appliance, and a combustible such as paper, cloth, dirt, or dust, a gap of a connection portion, looseness, DESCON of a branch trunk line wiring line, breakage of a cord insulating member, and the like occur, the values may be deviated from the ranges of the load-side electric path monitoring temperature, voltage, current, and resistance values preset (that is, allowable) according to a load to which the load-side electric path 4 is connected in a power source supply ON state in which power is supplied to the load to which the load-side electric path 4 is connected.

In this case, the first power cutoff unit 14 outputs a signal for switching to OFF to the ON/OFF switch disposed in the load-side electric path 4 in the power source supply ON state, and the power supply is cut off.

Note that the load-side electric path state determining unit 11 may determine that a leakage current is generated when the resistance value among the electric wire temperature value, the voltage value, the current value, and the resistance value allowable according to the load to which the load-side electric path 4 is connected is an insulation resistance normal value allowable according to the load to which the load-side electric path 4 is connected, and an insulation resistance value when the load is in a state of power source OFF is lower than an insulation resistance normal value stored in advance. When the allowable value of the resistance value among the allowable values of the temperature, the voltage value, the current value, and the resistance value preset for each of the load-side electric paths 4 is an insulation resistance normal value allowable according to the load connected to the load-side electric path 4, and an insulation resistance value when the load is in a state of power source OFF is lower than the insulation resistance normal value, the load-side electric path state determining unit 11 determines that the resistance value is out of the preset allowable value range.

When the load-side electric path state determining unit 11 makes such a determination, the operation/stop state information providing unit 13 determines that a leakage current is generated, and provides leakage current state occurrence information to the administrator terminal 31 used by an administrator who administers the load connected to the load-side electric path 4 for which the determination has been made, and the staff terminal 32a, 32b, 32c, 32d used by a staff who is in charge of administration of the load connected to the load-side electric path 4 for which the determination has been made.

The bolt tightening state determining unit 12 acquires a bolt tightening strength value in each of a power source-side electric path-electric device bolt/screw connection portion between the power source-side electric path 3 and the electric device 2, a load-side electric path-electric device bolt/screw connection portion between each of the plurality of load-side electric paths 4 and the electric device 2, and a load-side electric path-power source ON/OFF switch bolt/screw connection portion between each of the plurality of load-side electric paths 4 and the power source ON/OFF switch, and determines whether the acquired bolt tightening strength value is within a preset allowable bolt tightening value range.

When the bolt tightening state determining unit 13 determines that the acquired bolt tightening strength value is out of the preset allowable bolt tightening value range, the second power cutoff unit 15 outputs a signal for cutting off power supply via the power source-side electric path-electric device bolt/screw connection portion, the load-side electric path-electric device bolt/screw connection portion, and the load-side electric path-power source ON/OFF switch bolt/screw connection portion for which the determination has been made. In this case, the second power cutoff unit 15 outputs a signal for turning OFF power supply via the load-side electric path 4 connected to the power source-side electric path-electric device bolt/screw connection portion, the load-side electric path-electric device bolt/screw connection portion, and the load-side electric path-power source ON/OFF switch bolt/screw connection portion for which the bolt tightening state determining unit 13 has determined that the acquired bolt tightening strength value is out of the preset allowable bolt tightening value range to a power source ON/OFF switch disposed in the load-side electric path 4.

Figure 4:
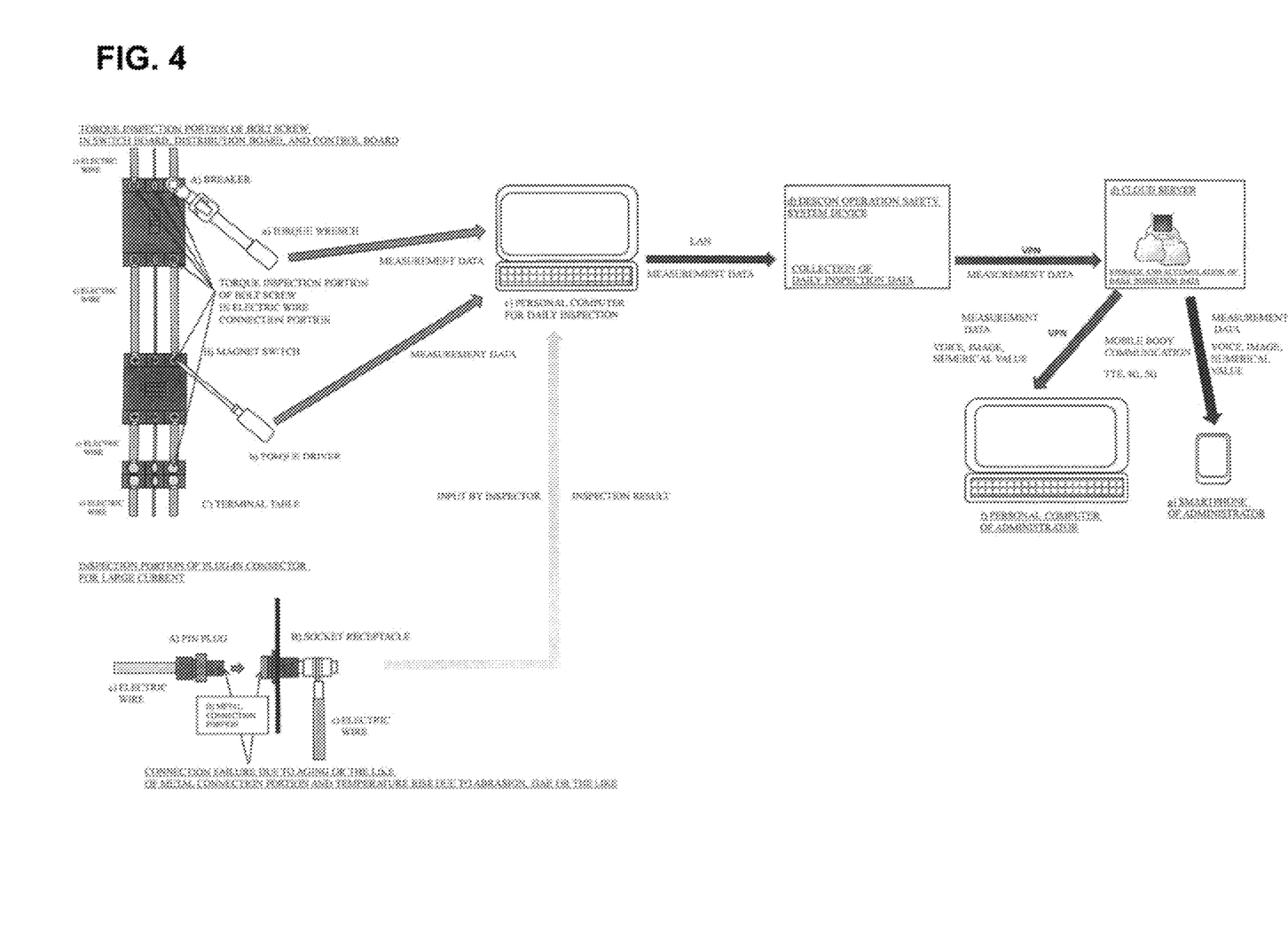
FIG. 4 is a block diagram for explaining an example of a flow of collecting tightening torque measurement data in a bolt screw tightening connection portion in the embodiment of the DESCON operation safety system according to the present invention.

As illustrated in FIG. 4, the bolt tightening strength value in each of the power source-side electric path-electric device bolt/screw connection portion, the load-side electric path-electric device bolt/screw connection portion, and the load-side electric path-power source ON/OFF switch bolt/screw connection portion is measured once a day, once a week, once a month, or the like using a torque wrench or the like.

The bolt tightening strength value obtained by the measurement is acquired by a device including a computer constituting the DESCON operation safety system and indicated as a cloud server in FIGS. 2 and 3 via a wired or wireless network. The bolt tightening state determining unit 12 determines whether or not the bolt tightening strength value is within an allowable tightening strength range preset for each of the bolt/screw connection portions. For example, when the measured tightening strength is lower than the allowable tightening strength by, for example, more than −10%, it is determined that the tightening strength is insufficient. In this way, the second power cutoff unit 15 outputs a signal for cutting off power supply via the electric device in which the bolt/screw connection portion determined to have insufficient tightening strength is present and the power source ON/OFF switch to an ON/OFF switch concerned.

In this way, the operation/stop state information providing unit 13 described above can also provide information regarding the operation/stop state of the load (information indicating that power source supply is cut off when the bolt tightening state determining unit 13 determines that a bolt tightening strength value of a load that should be originally in an operation state by an ON signal is out of the preset allowable bolt tightening value range, and the load is turned into an OFF state) to the administrator terminal 31 used by an administrator who administers the load and the staff terminals 32*a*, 32*b*, 32*c*, 32*d* used by a staff who is in charge of administration of the load even when the power source supply is cut off by the second power cutoff unit 15 and the load that should be originally in an operation state by an ON signal is turned into an OFF state.

As a result, when there is a possibility of occurrence of ignition caused by occurrence of a tracking phenomenon due to mixing of foreign matters into a connection fitting of a trunk line and a branch trunk line of the power receiving and transforming facility, the switch board, the distribution board, and the control board, or a terminal receptacle, insulation failure between a combustible such as paper, cloth, dirt, or dust, and an electrical appliance, a gap or looseness of a connection portion, DESCON of a branch trunk line wiring line, breakage of a cord insulating member, leakage due to insulation failure of an electrical appliance or breakdown, a fire by arc discharge, or an electric fire accident, occurrence of such a situation can be prevented.

In the present embodiment, the plurality of loads described above may be disposed in a building in which a water facility and a gas using device are disposed.

In such a case, the water charge calculating unit 16 and the gas usage charge calculating unit 17 can be further disposed.

The water charge calculating unit 16 detects a water usage amount of the water facility, and calculates a water usage charge charged to the water facility based on the detected water usage amount.

The gas usage charge calculating unit 17 detects a gas usage amount of the gas using device, and calculates a gas usage charge charged to the gas using device based on the detected gas usage amount.

For example, when a water facility is disposed in a building in which the plurality of loads described above is disposed, information regarding a water usage amount in the water facility is acquired in a wired or wireless manner from a water meter (electronic water meter for checking meter in FIG. 3) disposed in the water facility by a device including a computer constituting the DESCON operation safety system and indicated as a cloud server in FIGS. 2 and 3, and the water charge calculating unit 16 detects the water usage amount in the water facility based on a unit price of the water charge and calculates a water usage charge to be charged to the water facility based on the detected water usage amount.

When a gas using device is disposed in a building in which the plurality of loads described above is disposed, information regarding a gas usage amount in the gas using device is acquired in a wired or wireless manner from a gas meter (electronic gas meter for checking meter in FIG. 3) disposed in the gas using device by a device including a computer constituting the DESCON operation safety system and indicated as a cloud server in FIGS. 2 and 3, and the gas usage charge calculating unit 17 detects the gas usage amount in the gas using device based on a unit price of the gas usage charge and calculates a gas usage charge to be charged to the gas using device based on the detected gas usage amount.

Similarly to the processing and operation performed by the power charge calculating unit 10 described above, in the DESCON operation safety system of the present embodiment, a server device including a computer constituting this system can calculate a water usage charge, a gas usage charge, and a consumption tax from meter checking results of water and gas usage amounts consumed by each floor, each area, each room, each facility, and the like of a water facility or a gas using device in which a plurality of loads is disposed, each business partner, each department, and the like, and unit prices of water usage charge and gas usage charge, and the water charge calculating unit 16 and the gas usage charge calculating unit 17 can calculate a water usage charge and a gas usage charge of the building, a tenant, a business partner, or the like for each office of the building, each department, and each business partner. In the DESCON operation safety system of this embodiment, the water usage charge and the gas usage charge calculated by the water charge calculating unit 16 and the gas usage charge calculating unit 17 can provided, as information, from a server device including a computer constituting this system via a wired or wireless network to the administrator terminal 31 (a personal computer, a tablet, a smartphone, or the like of a head office) of a business partner or the like. In this case, the water usage charge and the gas usage charge can be provided as electronic information that can be printed in a form of a bill on the administrator terminal 31 (a personal computer, a tablet, a smartphone, or the like of a head office) of a business partner or the like.

The DESCON operation safety system 50 whose configuration example has been described above can be constituted by a computer. In this case, although not illustrated, a CPU that performs control such that various functions of the system of this embodiment are implemented according to an operating system, an installed or downloaded predetermined computer program, and the like, a ROM as a storage unit that stores an operating system, various computer programs, and the like, and stores data necessary for the CPU to execute processing for each control, a RAM or a hard disk that stores data necessary for the CPU to execute processing and is also used as a work area in which information is appropriately rewritten by the CPU, an information input/output unit such as a communication interface, and the like are included, and these are connected to each other by a necessary bus line.

An embodiment can be adopted in which a server computer disposed away from the power device 1, for example, a server computer built on a cloud constantly acquires information of each of a temperature, a voltage value, a current value, and a resistance value in each of the load-side electric paths 4 from each of the plurality of load-side electric path information detecting units (the electric wire temperature sensor 6 and the voltage/current/resistance measuring instrument 5 illustrated in FIG. 1) disposed in the power device 1 via a wired or wireless network, or acquires information regarding a bolt tightening strength value in each of a power source-side electric path-electric device bolt/screw connection portion, a load-side electric path-electric device bolt/screw connection portion, and a load-side electric path-power source ON/OFF switch bolt/screw connection portion measured once a day, once a week, once a month, or the like using a torque wrench or the like as illustrated in FIG. 4 via a wired or wireless network.

In the above description, some of the power source ON/OFF switching signal output unit 8, the operation/stop state grasping/determining unit 9, the power charge calculating unit 10, the load-side electric path state determining unit 11, the bolt tightening state determining unit 12, the operation/stop state information providing unit 13, the first power cutoff unit 14, the second power cutoff unit 15, the water usage charge calculating unit 16, and the gas usage charge calculating unit 17 implemented by operation of an arithmetic processing unit of the computer under a predetermined computer program may be disposed in the power device 1, and the remaining units may be included in a computer connected to the power device 1 so as to be able to exchange information via a wired or wireless network (for example, a computer indicated as a cloud server in FIGS. 2 and 3).

In addition, the DESCON operation safety system 50 of this embodiment can be configured such that a plurality of server computers each including some of the unit described above is connected to the power device 1 via a wired or wireless network so as to be able to exchange information with each other.

Hereinabove, the embodiment of the present invention has been described. However, the present invention is not limited to the above embodiment, and can be modified variously within a technical range understood from description of claims.

INDUSTRIAL APPLICABILITY

A target of the DESCON operation safety system is, for example, a system that can cope with all buildings, facilities, devices, instruments, and the like that use all power, such as buildings, trains, ships, cars, airplanes, elevators, factories, laboratories, power plants, substations, computer power sources, motors, conveyors, production facilities, robots, air conditioning, ventilation, lighting, refrigerating/freezing cases, refrigerators/freezers, solar power generation, wind power generation, rockets, storage batteries, power sources, transmission lines, trunk lines, wiring lines, connection devices, measuring instruments, and the like.

Therefore, it is considered that labor saving and an economic effect are large by introducing the following various types of targets of the DESCON operation safety system.

The invention claimed is:

1. A DESCON (disconnection) operation safety system comprising:
    a power device in which a power source-side electric path from a power source side and a plurality of load-side electric paths respectively directed to a plurality of loads are connected to each other via an electric device disposed in a housing;
    a power source ON/OFF switching signal output unit that outputs a power source ON/OFF switching signal that turns ON/OFF power supply to the plurality of loads via the load-side electric paths at a timing preset for the plurality of power source ON/OFF switches disposed respectively in the plurality of load-side electric paths;
    an operation/stop state grasping/determining unit that detects that each of the plurality of loads is in an operation/stop state according to the power source ON/OFF switching signal, and grasps and determines the operation/stop state of each of the plurality of loads;
    a power charge calculating unit that detects a power usage amount of each of the plurality of loads and calculates a power usage charge charged to each of the loads based on the detected power usage amount of each of the loads;
    a load-side electric path state determining unit that constantly acquires information of each of a temperature, a voltage value, a current value, and a resistance value in each of the load-side electric paths from each of a plurality of load-side electric path information detecting units respectively connected to the plurality of load-side electric paths, and determines whether any one of the acquired temperature, voltage value, current value, and resistance value is within an allowable value range preset for each of the load-side electric paths;
    a first power cutoff unit that outputs a signal for cutting off power supply via the load-side electric path when the load-side electric path state determining unit determines that any one of the temperature, the voltage value, the current value, and the resistance value acquired from each of the load-side electric path information detecting units is out of the allowable value range preset for each of the load-side electric paths, and the load-side electric path for which the determination has been made is in a power source supply ON state;
    a bolt tightening state determining unit that acquires a bolt tightening strength value in each of a power source-side electric path-electric device bolt/screw connection portion between the power source-side electric path and the electric device, a load-side electric path-electric device bolt/screw connection portion between each of the plurality of load-side electric paths and the electric device, and a load-side electric path-power source ON/OFF switch bolt/screw connection portion between each of the plurality of load-side electric paths and the power source ON/OFF switch, and determines whether the acquired bolt tightening strength value is within a preset allowable bolt tightening value range; and
    a second power cutoff unit that outputs a signal for cutting off power supply via the power source-side electric path-electric device bolt/screw connection portion, the load-side electric path-electric device bolt/screw connection portion, and the load-side electric path-power source ON/OFF switch bolt/screw connection portion for which it has been determined by the bolt tightening state determining unit that the acquired bolt tightening strength value is out of the preset allowable bolt tightening value range.

2. The DESCON operation safety system according to claim 1, wherein when the allowable value of the resistance value among the allowable values of the temperature, the voltage value, the current value, and the resistance value preset for each of the load-side electric paths is an insulation resistance normal value allowable according to the load connected to the load-side electric path, and an insulation resistance value when the load is in a power source OFF state is lower than the insulation resistance normal value, the load-side electric path state determining unit determines that the resistance value is out of the preset allowable value range.

3. The DESCON operation safety system according to claim 1, wherein
    the plurality of loads is disposed in a building in which a water facility and a gas using device are disposed, and
    the DESCON operation safety system further comprising:
    a water charge calculating unit that detects a water usage amount in the water facility and calculates a water usage charge charged to the water facility based on the detected water usage amount; and
    a gas charge calculating unit that detects a gas usage amount in the gas using device and calculates a gas usage charge charged to the gas using device based on the detected gas usage amount.

4. The DESCON operation safety system according to claim 3, wherein
    the power charge calculating unit calculates a power usage charge charged to the entire plurality of loads disposed in the building based on a power usage amount by the entire plurality of loads disposed in the building.

5. The DESCON operation safety system according to claim 1, comprising:
- an operation/stop state information providing unit that provides information regarding an operation/stop state of each of the plurality of loads grasped by the operation/stop state grasping/determining unit to an administrator terminal used by an administrator who administers the plurality of loads and a staff terminal used by a staff who is in charge of administration of the plurality of loads.

6. The DESCON operation safety system according to claim 2, comprising:
- an operation/stop state information providing unit that determines that a leakage current is generated when the load-side electric path state determining unit determines that the resistance value is out of the preset allowable value range, and provides leakage current state occurrence information to an administrator terminal used by an administrator who administers the load connected to the load-side electric path for which the determination has been made, and a staff terminal used by a staff who is in charge of administration of the load connected to the load-side electric path for which the determination has been made.

\* \* \* \* \*